US012773917B2

(12) United States Patent
Uno et al.

(10) Patent No.: US 12,773,917 B2
(45) Date of Patent: Oct. 27, 2026

(54) ONBOARD POWER DEVICE

(71) Applicants: TOYOTA JIDOSHA KABUSHIKI KAISHA, Toyota (JP); KABUSHIKI KAISHA TOYOTA JIDOSHOKKI, Kariya (JP)

(72) Inventors: Yoshiyuki Uno, Toyota (JP); Shinsuke Tsuda, Kariya (JP); Hiroo Ito, Kariya (JP)

(73) Assignees: TOYOTA JIDOSHA KABUSHIKI KAISHA, Toyota (JP); KABUSHIKI KAISHA TOYOTA JIDOSHOKKI, Kariya (JP)

( * ) Notice: Subject to any disclaimer, the term of this patent is extended or adjusted under 35 U.S.C. 154(b) by 517 days.

(21) Appl. No.: 18/515,992

(22) Filed: Nov. 21, 2023

(65) Prior Publication Data

US 2024/0174106 A1 May 30, 2024

(30) Foreign Application Priority Data

Nov. 29, 2022 (JP) ................................ 2022-189948

(51) Int. Cl.
*B60L 53/14* (2019.01)
*B60L 53/20* (2019.01)
*B60L 53/34* (2019.01)
*B60L 53/62* (2019.01)

(52) U.S. Cl.
CPC ............... *B60L 53/34* (2019.02); *B60L 53/20* (2019.02); *B60L 53/62* (2019.02)

(58) Field of Classification Search
CPC .......... B60L 53/34; B60L 53/20; B60L 53/62; B60L 53/14; B60L 3/0069; G01R 19/0084; H02J 7/02; H02J 7/60; H02J 7/751
See application file for complete search history.

(56) References Cited

U.S. PATENT DOCUMENTS

2008/0316774 A1 12/2008 Ito et al.

FOREIGN PATENT DOCUMENTS

JP 2008-312395 A 12/2008
JP 2021-112017 A 8/2021

*Primary Examiner* — Jamara A Franklin
(74) *Attorney, Agent, or Firm* — Oblon, McClelland, Maier & Neustadt, L.L.P.

(57) ABSTRACT

An onboard power device includes a power storage device, a bidirectional charging circuit connected to the power storage device via a first power line and connected to a second power line, an AC inlet connectable to an external power source and connected to a third power line, an AC outlet installed in a cabin and connected to a fourth power line, a switching relay to selectively connect the second power line to the third power line or the second power line to the fourth power line, and a voltage sensor including an input terminal connected to the third power line and an output terminal connected to a controller. The input terminal is electrically isolated from the portion between the switching relay and the power storage device.

4 Claims, 4 Drawing Sheets

ONBOARD POWER DEVICE

CROSS-REFERENCE TO RELATED APPLICATIONS

The present disclosure claims priority to Japanese Patent Application No. 2022-189948 filed Nov. 29, 2022, which is incorporated herein by reference in its entirety including specification, drawings, and claims.

TECHNICAL FIELD

The present disclosure relates to Onboard power device.

BACKGROUND

Conventionally, an onboard power device including a power storage device, a bidirectional charging circuit, an AC inlet, an AC outlet, a switching relay, and a voltage sensor has been proposed (see, for example, Japanese Patent Application Laid Open No. 2021-112017). The power storage device is connected to a first power line. The bidirectional charging circuit is connected to the first power line and a second power line. The AC inlet is connectable to an external power source and is connected to a third power line. The AC outlet is located in a cabin and is connected to a fourth power line. The switching relay selectively connects the second power line to the third power line or the second power line to the fourth power line. The voltage sensor is attached to the third power line.

SUMMARY

In such the onboard power devices, the input terminal of the voltage sensor may be electrically connected to the negative electrode bus bar of the DC section in the portion between the switching relay and the power storage device. In this case, when the second and fourth power lines are connected by the switching relay and AC power is supplied to the AC outlet, the potential of the third power line is approximately equal to the potential of the negative electrode bus bar of the DC section. At this time, a potential difference is generated between the potential of the third power line and the potential of the body ground.

The main object of the onboard power device of the present disclosure is to suppress the generation of the potential difference between the potential of the third power line to which the AC inlet is connected and the potential of the body ground, when the second power line to which the bidirectional charging circuit is connected and the fourth power line to which the AC outlet is connected are connected and the AC power is supplied to the AC outlet.

The onboard power device of the present disclosure employs the following configuration in order to achieve the above main object.

The onboard power device of the present disclosure, installed in a vehicle, includes a power storage device, a bidirectional charging circuit connected to the power storage device via a first power line and connected to a second power line, an AC inlet configured to be connectable to an external power source and connected to a third power line, an AC outlet installed in a cabin and connected to a fourth power line, a switching relay configured to selectively connect the second power line to the third power line or the second power line to the fourth power line, and a voltage sensor including an input terminal connected to the third power line and an output terminal connected to a controller. The input terminal is electrically isolated from the portion between the switching relay and the power storage device.

The onboard power device includes the voltage sensor. The voltage sensor includes the input terminal connected to the third power line and the output terminal connected to the controller. The input terminal of the voltage sensor is electrically isolated from the portion between the switching relay and the power storage device. Therefore, when the second and fourth power lines are connected by the switching relay and AC power is supplied to the AC outlet, the onboard power device of the present disclosure prevents the potential of the third power line from becoming approximately equipotential with any of the portions between the switching relay and the power storage device. As a result, at this time, the onboard power device of the present disclosure suppresses the generation of a potential difference between the potential of the third power line and the potential of the body ground.

DESCRIPTION OF EMBODIMENTS

Figure 1:
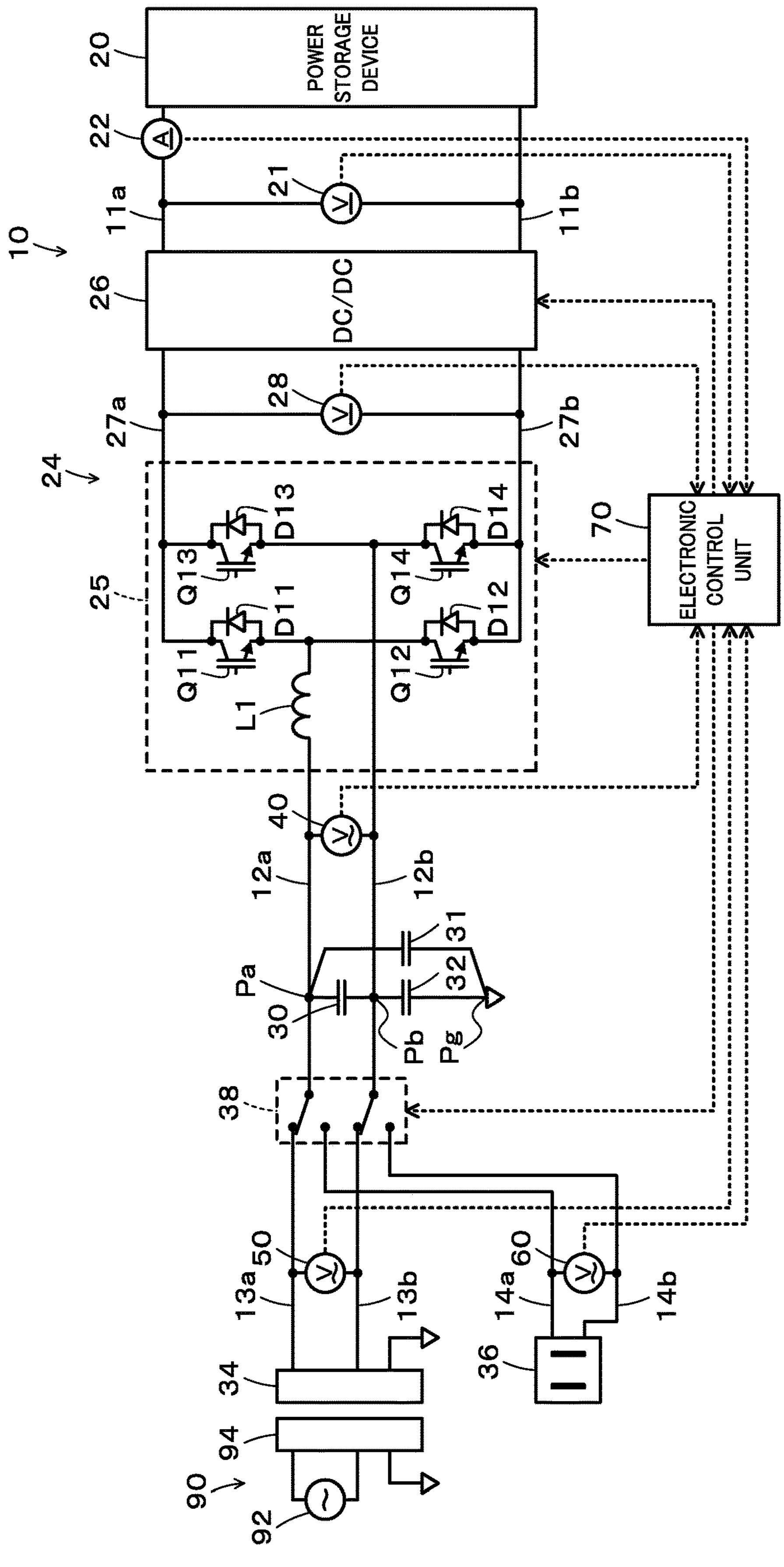
FIG. 1 is a schematic diagram of a present embodiment of an onboard power device.
Figure 2:
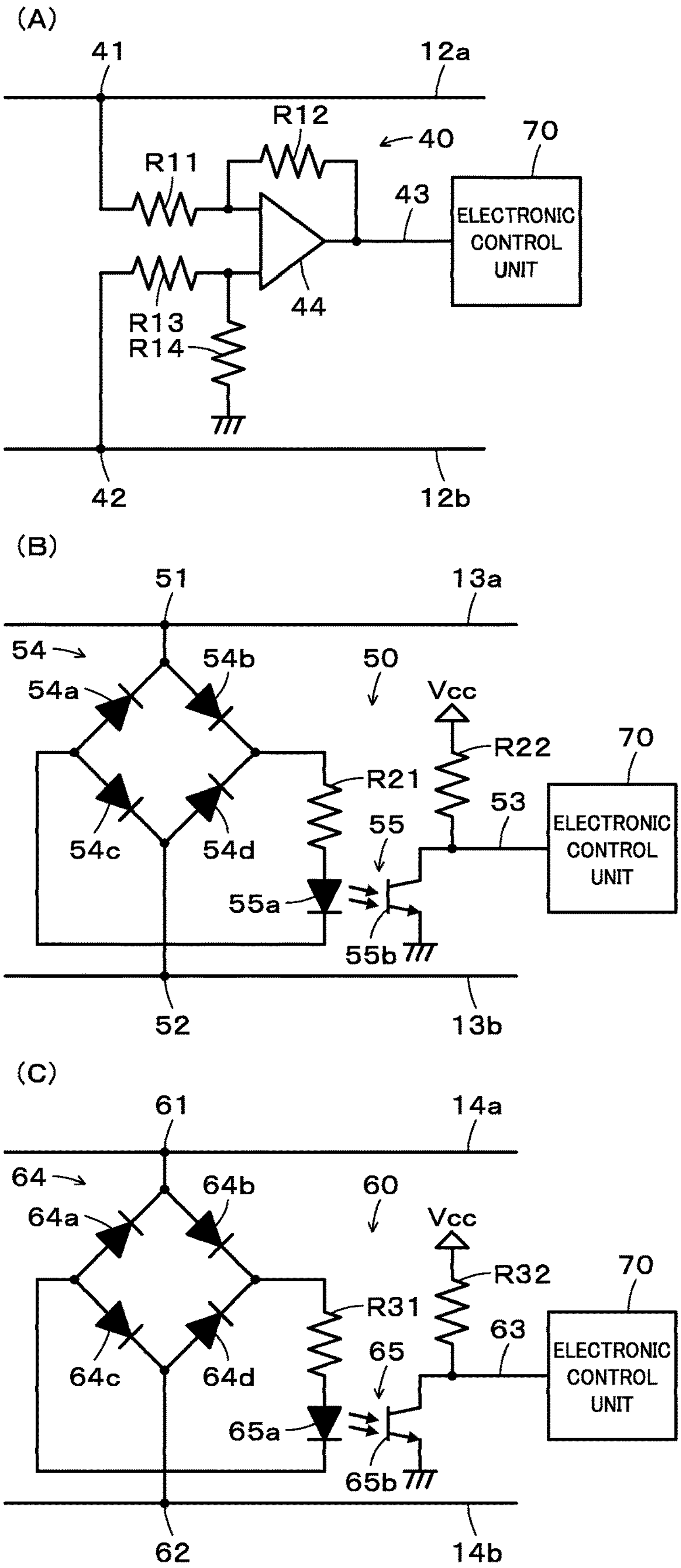
FIG. 2 is a schematic diagram of AC voltage sensors.

Embodiments of the present disclosure will be described with reference to the drawings. FIG. 1 is a schematic diagram of the present embodiment of the onboard power device 10. FIG. 2 is a schematic diagram of the AC voltage sensors 40, 50 and 60. FIG. 2(A) is a schematic diagram of the AC voltage sensor 40. FIG. 2(B) is a schematic diagram of the AC voltage sensor 50. FIG. 2(C) is a schematic diagram of the AC voltage sensor 60.

The onboard power device 10 is installed in any of a battery electric vehicle, a hybrid electric vehicle, or a fuel cell electric vehicle. As shown in FIG. 1, the onboard power device 10 includes the power storage device 20, the DC voltage sensor 21, the DC current sensor 22, the bidirectional charging circuit 24, the DC voltage sensor 28, the capacitors 30, 31 and 32, the AC inlet 34, the AC outlet 36, the switching relay 38, the AC voltage sensors 40, 50 and 60, the electronic control unit 70.

The power storage device 20 is configured as a lithium ion rechargeable battery or a nickel metal hydride battery, for example. The power storage device 20 is connected to the bidirectional charging circuit 24 via the first power lines 11*a* and 11*b*. The first power line 11*a* is the positive electrode bus bar between the power storage device 20 and the bidirectional charging circuit 24 in the DC section. The first power line 11*b* is the negative electrode bus bar between the power storage device 20 and the bidirectional charging circuit 24 in the DC section.

The DC voltage sensor 21 are attached to the first power lines 11*a* and 11*b*. The DC voltage sensor 21 outputs a signal to the electronic control unit 70 in response to the DC voltage between the first power lines 11*a* and 11*b*. The electronic control unit 70 detects the DC voltage Vdc1 between the first power lines 11*a* and 11*b* based on the signal from the DC voltage sensor 21. The DC voltage Vdc1 corresponds to the voltage between the terminals of the power storage device 20.

The DC current sensor 22 is attached to the first power line 11*a*. The DC current sensor 22 outputs a signal to the electronic control unit 70 in response to the DC current in the first power line 11*a*. The electronic control unit 70 detects the DC current Idc1 of the first power line 11*a* based on the signal from the DC current sensor 22. The DC current Idc1 corresponds to the charging or discharging current of the power storage device 20.

The bidirectional charging circuit 24 has the AC/DC converter 25 and the DC/DC converter 26. The AC/DC converter 25 is connected to the second power lines 12*a* and 12*b* and is connected to the DC/DC converter 26 via the intermediate power lines 27*a* and 27*b*. The intermediate power line 27*a* is the positive electrode bus bar between the AC/DC converter 25 and the DC/DC converter 26 in the DC section. The intermediate power line 27*b* is the negative electrode bus bar between the AC/DC converter 25 and the DC/DC converter 26 in the DC section.

The AC/DC converter 25 is configured as a well-known power factor correction circuit. The AC/DC converter 25 has the four switching elements Q11, Q12, Q13 and Q14, the four diodes D11, D12, D13 and D14 and the reactor L1. The switching elements Q11 and Q12 are connected in series to the intermediate power lines 27*a* and 27*b*. The connection point of switching elements Q11 and Q12 is connected to the second power line 12*a* via reactor L1. The switching elements Q13 and Q14 are connected in series to the intermediate power lines 27*a* and 27*b*. The connection point of switching elements Q13 and Q14 is connected to the second power line 12*b*. The AC/DC converter 25 converts the AC power of the second power lines 12*a* and 12*b* to DC power and supplies DC power to the intermediate power lines 27*a* and 27*b*, by switching the switching elements Q11, Q12, Q13, and Q14. The AC/DC converter 25 also converts the DC power of the intermediate power lines 27*a* and 27*b* to AC power and supplies the AC power to the second power lines 12*a* and 12*b*, by switching the switching elements Q11, Q12, Q13 and Q14. The AC/DC converter 25 is controlled by the electronic control unit 70.

The DC/DC converter 26 is connected to the power storage device 20 via the first power lines 11*a*, 11*b* and is connected to the AC/DC converter 25 via the intermediate power lines 27*a* and 27*b*. The DC/DC converter 26 has a switching element and a transformer. The DC/DC converter 26 exchanges DC power with voltage conversion between the first power lines 11*a* and 11*b* and the intermediate power lines 27*a* and 27*b*. The DC/DC converter 26 is controlled by the electronic control unit 70.

The DC voltage sensor 28 is attached to the intermediate power lines 27*a* and 27*b*. The DC voltage sensor 28 outputs a signal to the electronic control unit 70 in response to the DC voltage between the intermediate power lines 27*a* and 27*b*. The electronic control unit 70 detects the DC voltage Vdc2 between the intermediate power lines 27*a* and 27*b* based on the signal from the DC voltage sensor 28.

The capacitor 30 is connected to the second power line 12*a* at the connection point Pa and is connected to the second power line 12*b* at the connection point Pb. The capacitor 31 is connected to the second power line 12*a* at the connection point Pa and is connected to the body ground at the connection point Pg. The capacitor 32 is connected to the second power line 12*b* at the connection point Pb and is connected to the body ground at the connection point Pg. The capacitor 30 functions as X capacitor. The capacitors 31 and 32 function as Y capacitors.

The AC inlet 34 is connected to the third power lines 13*a* and 13*b*. The AC inlet 34 is configured to connect to the power source side connector 94. The power source side connector 94 is connected to the external power source 92 for AC at the charging stand 90. The charging stand 90 is located at a home or a charging station.

The AC outlet 36 is connected to the fourth power lines 14*a* and 14*b*. The AC outlet 36 is located in the cabin. The AC outlet 36 is configured to allow insertion of a plug for an electrical load.

The switching relay 38 selectively switches between the second power lines 12*a* and 12*b* and the third power lines 13*a* and 13*b*, or the second power lines 12*a* and 12*b* and the fourth power lines 14*a* and 14*b*. The switching relay 38 is controlled by the electronic control unit 70.

As shown in FIG. 2(A), the AC voltage sensor 40 is configured as a well-known differential amplifier circuit. The AC voltage sensor 40 has the two input terminals 41 and 42, the output terminal 43, the operational amplifier 44, and the resistor elements R11, R12, R13 and R14. The two input terminals 41 and 42 are connected to the second power lines 12*a* and 12*b*, respectively. The output terminal 43 is connected to the electronic control unit 70.

The inverting input terminal of the operational amplifier 44 is connected to the input terminal 41 via the resistor element R11 and is connected to the output terminal 43 via the resistor element R12. The non-inverting input terminal of the operational amplifier 44 is connected to the input terminal 42 via the resistor element R13 and is connected to the DC section ground via the resistor element R14. In the embodiment, the DC section ground is the first power line 11*b* and the intermediate power line 27*b*. The AC voltage sensor 40 outputs a signal to the electronic control unit 70 in response to the AC voltage between the second power lines 12*a* and 12*b*. The electronic control unit 70 detects the AC voltage Vac1 between the second power lines 12*a* and 12*b* based on the signal from the AC voltage sensor 40.

As shown in FIG. 2(B), the AC voltage sensor 50 has the two input terminals 51 and 52, the output terminal 53, the rectifier circuit 54, the photocoupler 55, and the resistor elements R21 and R22. The two input terminals 51 and 52 are connected to the third power lines 13*a* and 13*b*, respectively. The output terminal 53 is connected to the electronic control unit 70.

The rectifier circuit 54 is configured as a well-known diode bridge circuit. The rectifier circuit 54 has the four diodes 54*a*, 54*b*, 54*c* and 54*d*. The cathode of the diode 54*a* is connected to the anode of the diode 54*b*. The cathode of the diode 54*c* is connected to the anode of the diode 54*d*. The anode of the diode 54*a* is connected to the anode of the diode 54*c*. The cathode of the diode 54*b* is connected to the cathode of the diode 54*d*. The connection points of the diodes 54*a* and 54*b* are connected to the input terminal 51. The connection points of the diodes 54*c* and 54*d* are connected to the input terminal 52.

The photocoupler 55 has the light emitting diode 55*a* and the phototransistor 55*b*. The anode of the light emitting diode 55*a* is connected to the connection point of the diodes 54*b* and 54*d* via the resistor element R21. The cathode of the light emitting diode 55*a* is connected to the connection point of the diodes 54*a* and 54*c*. The emitter of the phototransistor 55*b* is connected to the DC section ground. The collector of the phototransistor 55*b* is connected to the reference potential Vcc via the resistor R22. The connection point between the collector of the phototransistor 55*b* and the resistor element R22 is connected to the output terminal 53.

Figure 3:
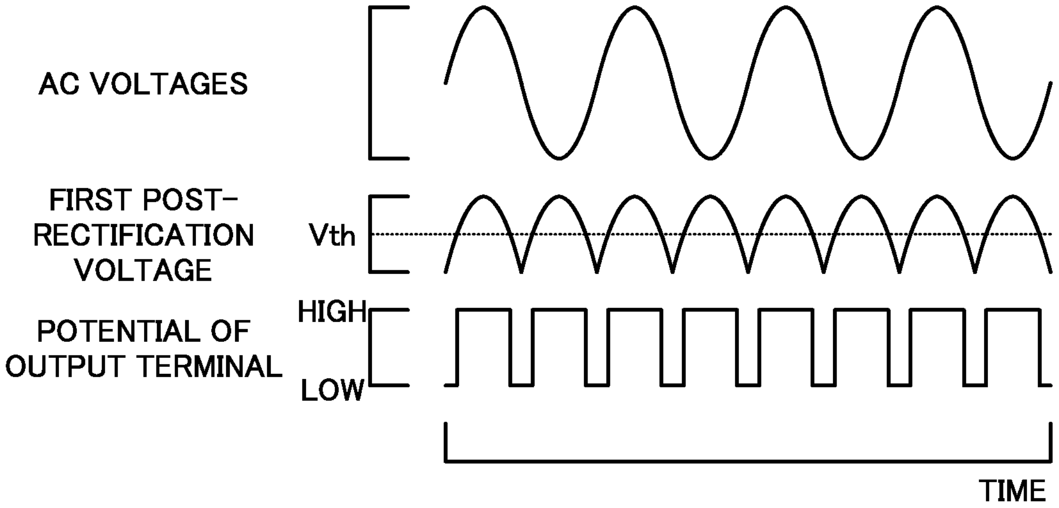
FIG. 3 is an illustration of an example waveform of the AC voltage sensor.

In the AC voltage sensor 50, the rectifier circuit 54 rectifies the AC voltage of the third power lines 13*a* and 13*b* with full-wave rectification and outputs the first post-rectification voltage. The photocoupler 55 makes the potential of the output terminal 53 high or low according to the first post-rectification voltage. FIG. 3 illustrates an example of the waveform of the AC voltage sensor 50. In FIG. 3, from the top to the bottom are the AC voltages of the third power lines 13*a* and 13*b*, the first post-rectification voltage, and the potential of the output terminal 53. As illustrated, when the first post-rectification voltage is less than the threshold Vth1, the potential of the output terminal 53 is low. When the first post-rectification voltage is equal to or higher than the threshold Vth1, the potential of the output terminal 53 is high. The threshold value Vth1 is the lower limit of the voltage range at which the light emitting diode 55*a* emits light and the phototransistor 55*b* turns on. Therefore, by the waveform of the potential of the output terminal 53, the electronic control unit 70 detects whether or not the AC voltage is applied to the third power lines 13*a* and 13*b*. When the AC voltage is applied to the third power lines 13*a* and 13*b*, the electronic control unit 70 also detects the frequency of the AC voltage on the third power lines 13*a* and 13*b*.

As shown in FIG. 2(C), the AC voltage sensor 60 has the two input terminals 61 and 62, the output terminal 63, the rectifier circuit 64, the photocoupler 65, and the resistor elements R31 and R32. The two input terminals 61 and 62 are connected to the fourth power lines 14*a* and 14*b*, respectively. The output terminal 63 is connected to the electronic control unit 70.

The rectifier circuit 64 is configured as a well-known diode bridge circuit. The rectifier circuit 64 has the four diodes 64*a*, 64*b*, 64*c* and 64*d*. The cathode of the diode 64*a* is connected to the anode of the diode 64*b*. The cathode of the diode 64*c* is connected to the anode of the diode 64*d*. The anode of the diode 64*a* is connected to the anode of the diode 64*c*. The cathode of the diode 64*b* is connected to the cathode of the diode 64*d*. The connection points of the diodes 64*a* and 64*b* are connected to the input terminal 61. The connection points of the diodes 64*c* and 64*d* are connected to the input terminal 62.

The photocoupler 65 has the light emitting diode 65*a* and the phototransistor 65*b*. The anode of the light emitting diode 65*a* is connected to the connection point of the diodes 64*b* and 64*d* via the resistor element R31. The cathode of the light emitting diode 65*a* is connected to the connection point of the diodes 64*a* and 64*c*. The emitter of the phototransistor 65*b* is connected to the DC section ground. The collector of the phototransistor 65*b* is connected to the reference potential Vcc via resistor R32. The connection point between the collector of the phototransistor 65*b* and the resistor element R22 is connected to the output terminal 63.

The AC voltage sensor 60 operates in the same manner as the AC voltage sensor 50. Specifically, the rectifier circuit 64 rectifies the AC voltage of the fourth power lines 14*a* and 14*b* with full-wave rectification and outputs the second post-rectification voltage. The photocoupler 65 makes the potential of the output terminal 63 high or low according to the second post-rectification voltage. When the second post-rectification voltage is less than the threshold Vth2, the potential of the output terminal 63 is low. When the second post-rectification voltage is equal to or higher than the threshold Vth2, the potential of the output terminal 63 is high. The threshold value Vth2 is the lower limit of the voltage range at which the light emitting diode 65*a* emits light and the phototransistor 65*b* turns on. Therefore, by the waveform of the potential of the output terminal 63, the electronic control unit 70 detects whether or not the AC voltage is applied to the fourth power lines 14*a* and 14*b*. When the AC voltage is applied to the fourth power lines 14*a* and 14*b*, the electronic control unit 70 also detects the frequency of the AC voltage on the fourth power lines 14*a* and 14*b*.

The electronic control unit 70 includes a microcomputer. The microcomputer has a CPU, ROM, RAM, flash memory, input/output ports, and communication ports. The electronic control unit 70 inputs the signals from the various sensors via the input ports. As shown in FIG. 1, for example, the electronic control unit 70 inputs the signals from the DC voltage sensors 21, 28, the AC voltage sensors 40, 50, 60, and the current sensor 22.

The electronic control unit 70 detects the DC voltage Vdc1 between the first power lines 11*a* and 11*b* based on the signal from the DC voltage sensor 21. The DC voltage Vdc1 corresponds to the voltage between the terminals of the power storage device 20. The electronic control unit 70 detects the DC voltage Vdc2 between the intermediate power lines 27*a* and 27*b* based on the signal from the DC voltage sensor 28. The electronic control unit 70 detects the AC voltage Vac1 between the second power lines 12*a* and 12*b* based on the signal from the AC voltage sensor 40. The electronic control unit 70 detects whether or not the AC voltage is applied to the third power lines 13*a* and 13*b* based on the signal from the AC voltage sensor 50. When the AC voltage is applied to the third power lines 13*a* and 13*b*, the electronic control unit 70 detects the frequency of the AC voltage on the third power lines 13*a* and 13*b* based on the signal from the AC voltage sensor 50. The electronic control unit 70 detects whether or not the AC voltage is applied to the fourth power lines 14*a*, 14*b* based on the signal from the AC voltage sensor 60. When the AC voltage is applied to the fourth power lines 14*a* and 14*b*, the electronic control unit 70 detects the frequency of the AC voltage on the fourth power lines 14*a* and 14*b* based on the signal from the AC voltage sensor 60. The electronic control unit 70 detects the DC current Idc1 of the first power line 11*a* based on the signal from the DC current sensor 22. The DC current Idc1 corresponds to the charging or discharging current of the power storage device 20. The electronic control unit 70 calculates the state of charge SOC of the power storage device 20 based on the integrated value of the DC current Idc1 of the first power line 11*a*.

The electronic control unit 70 outputs the various control signals via the output ports. For example, the electronic control unit 70 outputs the control signals to the AC/DC converter 25, the DC/DC converter 26, and the switching relay 38.

The operation of the onboard power device 10 is described next. First, an abnormal diagnosis of the switching relay 38 will be explained. When the electronic control unit 70 controls the switching relay 38 such that the second power lines 12*a* and 12*b* and the third power lines 13*a* and 13*b* are connected, the electronic control unit 70 performs the abnormal diagnosis of the switching relay 38 using the signals from the AC voltage sensors 40 and 50. When the electronic control unit 70 controls the switching relay 38 such that the second power lines 12*a* and 12*b* and the fourth power lines 14*a* and 14*b* are connected, the electronic control unit 70 performs the abnormal diagnosis of the switching relay 38 using the signals from the AC voltage sensors 40 and 60. Basically, the switching relay 38 connects the second power lines 12*a* and 12*b* and the fourth power lines 14*a* and 14*b*.

Next, the operation of the onboard power device 10 during the external charging is described. In the external charging, the AC power from the external power source 92 is converted from the AC power to the DC power and also converted to voltage by the bidirectional charging circuit 24, and the DC power is supplied to the power storage device 20.

When the power source side connector 94 and the AC inlet 34 are connected at home or at a charging station, the charging stand 90 compares the respective differences ΔVa and ΔVb between the respective potentials of the third power lines 13*a* and 13*b* and the body ground with the threshold value ΔVth. When each the difference ΔVa and ΔVb is less than or equal to the threshold value ΔVth, the charging stand 90 sends a permission signal for the external charging to the electronic control unit 70. When at least one of the respective differences ΔVa and ΔVb is greater than the threshold value ΔVth, the charging stand 90 sends a prohibit signal for the external charging to the electronic control unit 70.

When the charging start condition is satisfied while the electronic control unit 70 is receiving the permission signal for the external charging from the charging stand 90, the electronic control unit 70 executes the preparation process, the charging process, and the termination process in this order. The charging start condition includes at least one of the following conditions: a condition in which the start of charging is indicated by the user, or a condition in which the charging start time set by the user is reached, etc. In the preparation process, the electronic control unit 70 controls the switching relay 38 such that the second power lines 12*a* and 12*b* and the third power lines 13*a* and 13*b* are connected. In the charging process, the electronic control unit 70 controls the bidirectional charging circuit 24 such that the external charging is performed. The termination process is executed when the charging termination condition is satisfied during the execution of the charging process. The charging termination condition includes at least one of the following conditions: a condition in which the state of charge SOC of the power storage device 20 has reached a predetermined percentage near full charge, or the end of charging is indicated by the user, etc. In the termination process, the electronic control unit 70 stops driving the bidirectional charging circuit 24. In the termination process, the electronic control unit 70 also controls the switching relay 38 such that the second power lines 12*a* and 12*b* and the fourth power lines 14*a* and 14*b* are connected.

When the electronic control unit 70 has not received the permission signal for the external charging from the charging stand 90, the electronic control unit 70 does not execute the preparation process, the charging process, and the termination process even if the charging start condition is satisfied. That is, the external charging is prohibited. At least one of the charging stand 90 and the electronic control unit 70 may inform the user that the external charging is prohibited. When the electronic control unit 70 has not received the permission signal for the external charging from the charging stand 90, includes when the electronic control unit 70 has received the prohibit signal for the external charging from the charging stand 90.

Next, the operation of the onboard power device 10 during the AC outlet power supply is described. In the AC outlet power supply, the DC power from the power storage device 20 is converted to the AC power by the bidirectional charging circuit 24, along with the voltage conversion, and the AC power is supplied to the AC outlet 36. As mentioned above, the second power lines 12*a* and 12*b* and the fourth power lines 14*a* and 14*b* are basically connected by the switching relay 38.

When an electrical load is connected to the AC outlet 36, the electronic control unit 70 controls the AC/DC converter 25 of the bidirectional charging circuit 24 as follows. In the positive section of the AC power supplied to the AC outlet 36, the electronic control unit 70 holds the switching elements Q11 and Q14 off and the switching element Q13 on and switches the switching element Q12. In the negative section of the AC power supplied to the AC outlet 36, the electronic control unit 70 holds the switching elements Q12 and Q13 off and the switching element Q14 on and switches the switching element Q11. The AC power is therefore supplied to the electrical load connected to the AC outlet 36.

Figure 4:
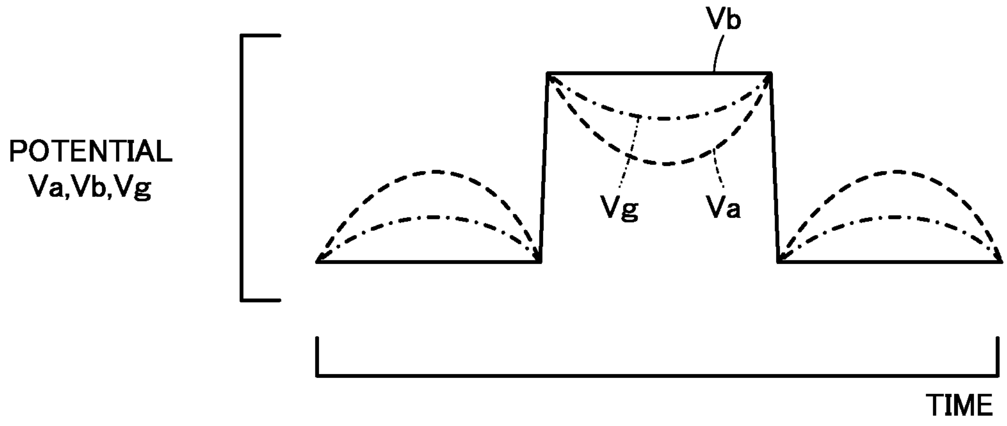
FIG. 4 is an illustration showing an example of the waveforms of potentials at connection points relative to DC section ground when an AC outlet power supply is performed.

FIG. 4 shows an example of the waveforms of the potentials Va, Vb, and Vg at the connection points Pa, Pb, and Pg relative to the DC section ground during the AC outlet power supply. The connection points Pa, Pb, and Pg are shown in FIG. 2. As shown in FIG. 4, the potentials Va, Vb, and Vg at the connection points Pa, Pb, and Pg vary greatly with respect to the DC section ground. This is because the electronic control unit 70 controls the switching elements Q11, Q12, Q13, and Q14 as described above. The control of the switching elements Q11, Q12, Q13, and Q14 causes the respective potentials of the fourth power lines 14*a* and 14*b* and the respective potentials of the second power lines 12*a* and 12*b* to fluctuate significantly with respect to the DC section ground. That is, the respective potentials Va and Vb at the connection points Pa and Pb fluctuate significantly with respect to the DC section ground. Therefore, the potential Vpc at the connection point Pg of capacitors 31 and 32 also fluctuates significantly with respect to the DC section ground. In other words, the potential of the body ground also fluctuates significantly with respect to the DC section ground.

Figure 5:
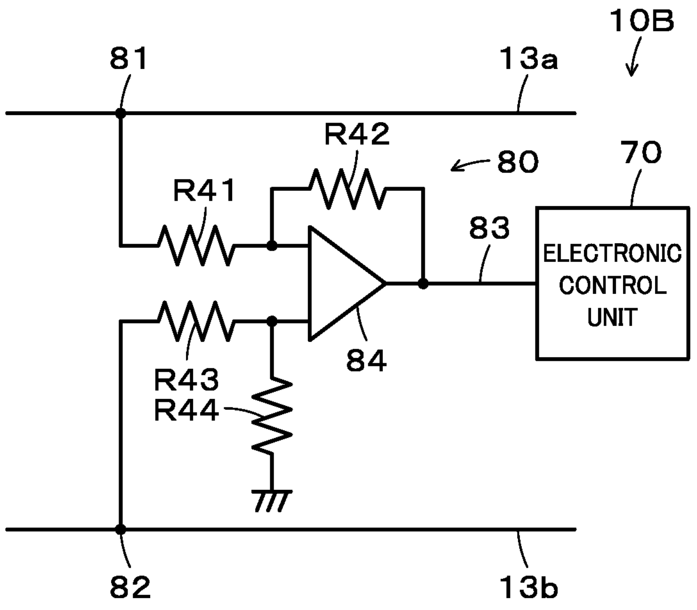
FIG. 5 is a schematic diagram of the AC voltage sensor of a comparative example.

The following is a case in which the onboard power device 10B of the comparative example is used instead of the onboard power device 10 of the present embodiment. The onboard power device 10 differs from the onboard power device 10B in that the onboard power device 10 of the present embodiment includes the AC voltage sensor 50, whereas the onboard power device 10B of comparative example includes the AC voltage sensor 80. That is, the onboard power device 10 and the onboard power device 10B are identical, except that the AC voltage sensor 50 and the AC voltage sensor 80 are different. FIG. 5 is a schematic diagram of the AC voltage sensor 80 of the comparative example. As shown in FIG. 5, the AC voltage sensor 80 of the comparative example is configured in the same way as the AC voltage sensor 40.

The AC voltage sensor 80 has the two input terminals 81 and 82, the output terminal 83, the operational amplifier 84, and the resistor elements R41, R42, R43 and R44. The two input terminals 81 and 82 are connected to the third power lines 13*a* and 13*b*, respectively. The output terminal 83 is connected to the electronic control unit 70.

The inverting input terminal of the operational amplifier 84 is connected to the input terminal 81 via the resistor element R41 and is connected to the output terminal 83 via the resistor element R42. The non-inverting input terminal of the operational amplifier 84 is connected to the input terminal 82 via the resistor element R43 and is connected to DC section ground via the resistor element R44. The AC voltage sensor 80 outputs a signal to the electronic control unit 70 in response to the AC voltage between the third power lines 13*a* and 13*b*. The electronic control unit 70 detects the AC voltage Vac2 between the third power lines 13*a* and 13*b* based on the signal from the AC voltage sensor 80.

In the AC voltage sensor 80, the third power line 13*a* is connected to the DC section ground via the resistor R41, the operational amplifier 84, and the resistor R44. The third power line 13*b* is connected to the DC section ground via the resistors R43 and R44. Therefore, during the AC outlet power supply, even though the second power lines 12*a* and 12*b* and the third power lines 13*a* and 13*b* are not connected, the respective potentials of the third power lines 13*a* and 13*b* are roughly equal to the potential of the DC section ground. At this time, a potential difference is generated between the respective potentials of the third power lines 13*a* and 13*b* and the potential of the body ground. Therefore, when the power source side connector 94 and the AC inlet 34 are connected, the charging stand 90 determines that at least one of the respective differences ΔVa and ΔVb between the respective potentials of the third power lines 13*a* and 13*b* and the potential of the body ground is greater than the threshold value ΔVth. The charging stand 90 then sends the prohibit signal for the external charging to the electronic control unit 70. Therefore, the external charging is prohibited.

In contrast, the AC voltage sensor 50 of the present embodiment includes the photocoupler 55. Therefore, the input terminals 51 and 52 of the AC voltage sensor 50 are electrically isolated from the DC section ground. Therefore, during the AC outlet power supply, the onboard power device 10 of the present embodiment suppress the respective potentials of the third power lines 13*a* and 13*b* from becoming roughly equal to the potential of the DC section ground. As a result, during the AC outlet power supply, the onboard power device 10 of the present embodiment suppress the generation of the potential difference between the respective potentials of the third power lines 13*a* and 13*b* and the potential of the body ground. Therefore, when the power source side connector 94 and the AC inlet 34 are connected, the charging stand 90 determines that the respective differences ΔVa and ΔVb between the respective potentials of the third power lines 13*a* and 13*b* and the potential of the body ground are all less than or equal to the threshold value ΔVth. The charging stand 90 then sends the permission signal for the external charging to the electronic control unit 70. Therefore, the external charging is permitted.

The onboard power device 10 of the present embodiment also includes the AC voltage sensor 60 similar to the AC voltage sensor 50. That is, the AC voltage sensor 60 includes the photocoupler 65. Therefore, the input terminals 61 and 62 of the AC voltage sensor 60 are electrically isolated from the DC section ground. Therefore, during the external charging, the onboard power device 10 of the present embodiment suppress the respective potentials of the fourth power lines 14*a* and 14*b* from becoming roughly equipotential with the potential of the DC section ground. As a result, during the external charging, the onboard power device 10 of the present embodiment suppress the generation of the potential difference between the respective potentials of the fourth power lines 14*a* and 14*b* and the potential of the body ground.

The onboard power device 10 of the present embodiment described equal to or higher than the above includes the AC voltage sensor 50. The input terminals 51 and 52 of the AC voltage sensor 50 are connected to the third power lines 13*a* and 13*b* and are isolated from the DC section ground. The third power lines 13*a* and 13*b* are connected to the AC inlet 34. The DC section ground is the first power line 11*b* and the intermediate power line 27*b*. Therefore, during the AC outlet power supply, the onboard power device 10 of the present embodiment prevent the respective potentials of the third power lines 13*a* and 13*b* from becoming roughly equal to the potential of the DC section ground. As a result, during the AC outlet power supply, the onboard power device 10 of the present embodiment suppress the generation of the potential difference between the respective potentials of the third power lines 13*a* and 13*b* and the potential of the body ground.

In the embodiment described above, the AC voltage sensor 50 includes the photocoupler 55. However, the AC voltage sensor 50 may include the input terminals 51 and 52 which is electrically isolated from the DC section ground. For example, the AC voltage sensor 50 may include an isolation amplifier.

In the embodiment described above, the AC voltage sensor 60 is configured in the same way as the AC voltage sensor 50. However, the AC voltage sensor 60 may be configured in the same manner as the AC voltage sensor 40. The onboard power device 10 may not include the AC voltage sensor 60.

Herein, the onboard power device of the present disclosure may be configured as follows. In the onboard power device of the present disclosure, the voltage sensor may include a rectifier circuit connected to the input terminal and a photocoupler that outputs a signal based on an output voltage of the rectifier circuit to the output terminal.

In the onboard power device of the present disclosure, the bidirectional charging circuit may include an AC/DC converter connected to the fourth power line and a DC/DC converter connected to the AC/DC converter and the first power line, and the input terminal may be electrically isolated from a DC section between the AC/DC converter and the power storage device.

In the onboard power device of the present disclosure, the onboard power device may include a second voltage sensor including a second input terminal connected to the fourth power line and a second output terminal connected to the controller, and the second input terminal may be electrically isolated from the portion between the switching relay and the power storage device.

The following describes the correspondence relationship between the primary elements of the above embodiment and the primary elements of the disclosure described in Summary. In the embodiment, the power storage device 20 corresponds to "power storage device", the bidirectional charging circuit 24 corresponds to "bidirectional charging circuit", the AC inlet 34 corresponds to "AC inlet", the AC outlet 36 corresponds to "AC outlet", the switching relay 38 corresponds to "switching relay", the AC voltage sensor 50 corresponds to "voltage sensor". The AC voltage sensor 60 corresponds to "second voltage sensor".

The correspondence between the major elements of the embodiment and the major elements of the invention described in the means to solve a problem section is an example of how the embodiment can be used to specifically explain the embodiment of the invention described in the means to solve a problem section. This does not limit the elements of the invention described in the means to solve the problem section. In other words, interpretation of the invention described in the means to solve a problem section should be based on the description in that section, and the embodiment is only one specific example of the invention described in the means to solve a problem section.

The above is a description of the form for implementing this disclosure using the embodiment. However, the present disclosure is not limited in any way to these embodiments, and can of course be implemented in various forms within the scope that does not depart from the gist of the present disclosure.

INDUSTRIAL APPLICABILITY

The present disclosure is applicable to the manufacturing industry for the onboard power devices and other applications.

The invention claimed is:

1. An onboard power device installed in a vehicle, comprising: a power storage device; a bidirectional charging circuit connected to the power storage device via a first power line and connected to a second power line; an AC inlet configured to be connectable to an external power source and connected to a third power line; an AC outlet installed in a cabin and connected to a fourth power line; a switching relay configured to selectively connect the second power line to the third power line or the second power line to the fourth power line; and a voltage sensor including an input terminal connected to the third power line and an output terminal connected to a controller, wherein the input terminal is electrically isolated from a portion between the switching relay and the power storage device.

2. The onboard power device according to claim 1, wherein the voltage sensor includes a rectifier circuit connected to the input terminal and a photocoupler that outputs a signal based on an output voltage of the rectifier circuit to the output terminal.

3. The onboard power device according to claim 1, wherein the bidirectional charging circuit includes an AC/DC converter connected to the fourth power line and a DC/DC converter connected to the AC/DC converter and the first power line, and the input terminal is electrically isolated from a DC section between the AC/DC converter and the power storage device.

4. The onboard power device according to claim 1, wherein the onboard power device comprises a second voltage sensor including a second input terminal connected to the fourth power line and a second output terminal connected to the controller, and the second input terminal is electrically isolated from the portion between the switching relay and the power storage device.

* * * * *